US007904975B2

(12) United States Patent
Kruglikov et al.

(10) Patent No.: US 7,904,975 B2
(45) Date of Patent: Mar. 15, 2011

(54) REAL-TIME DISPLAY OF AVAILABLE PRODUCTS OVER THE INTERNET

(75) Inventors: Andre Kruglikov, Atherton, CA (US); Sandeep Nijhawan, San Jose, CA (US); Ajit Ramachandra Mayya, Saratoga, CA (US); Sunil Bhargava, Hillsborough, CA (US); Margaret Sue Lloyd, Menlo Park, CA (US); Justin Miller, Sunnyvale, CA (US)

(73) Assignee: IpVenture, Inc., Los Altos, CA (US)

( * ) Notice: Subject to any disclaimer, the term of this patent is extended or adjusted under 35 U.S.C. 154(b) by 0 days.

(21) Appl. No.: 11/879,484

(22) Filed: Jul. 17, 2007

(65) Prior Publication Data
US 2008/0015959 A1    Jan. 17, 2008

Related U.S. Application Data

(63) Continuation of application No. 11/705,982, filed on Feb. 12, 2007, which is a continuation of application No. 09/568,603, filed on May 10, 2000, now Pat. No. 7,177,825.

(60) Provisional application No. 60/133,646, filed on May 11, 1999.

(51) Int. Cl.
*G06Q 10/00*    (2006.01)
*G06Q 30/00*    (2006.01)
(52) U.S. Cl. .................................... 5/28; 705/26; 705/9
(58) Field of Classification Search ............. 705/26, 705/28
See application file for complete search history.

(56) References Cited

U.S. PATENT DOCUMENTS

| 2,781,643 | A | 2/1957 | Fairweather |
| 3,406,532 | A | 10/1968 | Rownd et al. |
| 3,670,867 | A | 6/1972 | Traube |
| 4,213,310 | A | 7/1980 | Buss |
| 4,455,453 | A | 6/1984 | Parasekvakos et al. |
| 4,530,067 | A | 7/1985 | Dorr |
| 4,656,591 | A | 4/1987 | Goldberg |
| 4,803,348 | A | 2/1989 | Lohrey et al. |
| 4,823,984 | A | 4/1989 | Ficken |
| 4,887,208 | A | 12/1989 | Schneider et al. |

(Continued)

FOREIGN PATENT DOCUMENTS
EP    0 425 405 A2 *   5/1991

(Continued)

OTHER PUBLICATIONS

Business/Technology Editors. (Dec. 16, 1998). Numetrix Unveils xtr@; an Internet-Designed Solution for Real-Time Supply Chain Collaboration. Business Wire,1. Retrieved Jan. 16, 2010, from Business Dateline. (Document ID: 37215461).*

(Continued)

*Primary Examiner* — Matthew S Gart
*Assistant Examiner* — Scott A Zare

(57) ABSTRACT

Computer implemented methods and apparatus for determining availability information for a first one of a plurality of products for publication via a wide area network. The availability information is calculated with reference to a delivery date, an available number of units, and a reserved number of units, the delivery date having been specified by a user via the network, the available number of units having been determined with reference to inventory information, and the reserved number of units having been determined with reference to current order information.

34 Claims, 6 Drawing Sheets

U.S. PATENT DOCUMENTS

| | | | |
|---|---|---|---|
| 4,936,738 A | 6/1990 | Brennan | |
| 4,958,280 A | 9/1990 | Pauly et al. | |
| 5,038,283 A | 8/1991 | Caveney | |
| 5,093,794 A | 3/1992 | Howie et al. | |
| 5,101,352 A | 3/1992 | Rembert | |
| 5,105,627 A | 4/1992 | Kurita | |
| 5,113,349 A | 5/1992 | Nakamura et al. | |
| 5,122,959 A | 6/1992 | Nathanson et al. | |
| 5,235,819 A | 8/1993 | Bruce | |
| 5,237,158 A | 8/1993 | Kern et al. | |
| 5,246,332 A | 9/1993 | Bernard | |
| 5,265,006 A | 11/1993 | Asthana | |
| 5,272,638 A | 12/1993 | Martin et al. | |
| 5,273,392 A | 12/1993 | Bernard | |
| 5,322,406 A | 6/1994 | Pippin et al. | |
| 5,334,824 A | 8/1994 | Martinez | |
| 5,362,948 A | 11/1994 | Morimoto | |
| 5,363,310 A | 11/1994 | Haj-Ali-Ahmadi et al. | |
| 5,395,206 A | 3/1995 | Cerny, Jr. | |
| 5,402,336 A | 3/1995 | Spiegelhoff et al. | |
| 5,428,546 A | 6/1995 | Shah et al. | |
| 5,434,394 A | 7/1995 | Roach et al. | |
| 5,450,317 A | 9/1995 | Lu et al. | |
| 5,479,530 A | 12/1995 | Nair et al. | |
| 5,533,361 A | 7/1996 | Halpern | |
| 5,535,407 A | 7/1996 | Yanagawa et al. | |
| 5,548,518 A | 8/1996 | Dietrich et al. | |
| 5,553,312 A | 9/1996 | Gattey et al. | |
| 5,568,393 A | 10/1996 | Ando et al. | |
| 5,592,378 A | 1/1997 | Cameron et al. | |
| 5,593,269 A | 1/1997 | Bernard | |
| 5,598,487 A | 1/1997 | Hacker et al. | |
| 5,615,121 A | 3/1997 | Babayev et al. | |
| 5,640,002 A | 6/1997 | Ruppert et al. | |
| 5,664,110 A | 9/1997 | Green et al. | |
| 5,666,493 A | 9/1997 | Wojcik et al. | |
| 5,687,322 A | 11/1997 | Deaton et al. | |
| 5,694,551 A | 12/1997 | Doyle et al. | |
| 5,710,887 A | 1/1998 | Chelliah et al. | |
| 5,712,989 A | 1/1998 | Johnson et al. | |
| 5,758,313 A | 5/1998 | Shah et al. | |
| 5,758,328 A | 5/1998 | Giovannoli | |
| 5,758,329 A * | 5/1998 | Wojcik et al. | 705/28 |
| 5,761,673 A | 6/1998 | Bookman et al. | |
| 5,768,139 A | 6/1998 | Pippin et al. | |
| H1743 H | 8/1998 | Graves et al. | |
| 5,809,479 A | 9/1998 | Martin et al. | |
| 5,816,725 A | 10/1998 | Sherman et al. | |
| 5,826,242 A | 10/1998 | Montulli | |
| 5,826,825 A | 10/1998 | Gabriel | |
| 5,831,860 A | 11/1998 | Foladare et al. | |
| 5,832,457 A | 11/1998 | O'Brien | |
| 5,834,753 A | 11/1998 | Danielson et al. | |
| 5,835,914 A | 11/1998 | Brim | |
| 5,839,117 A | 11/1998 | Cameron et al. | |
| 5,848,395 A | 12/1998 | Edgar et al. | |
| 5,878,401 A | 3/1999 | Joseph | |
| 5,880,443 A | 3/1999 | McDonald et al. | |
| 5,884,216 A | 3/1999 | Shah et al. | |
| 5,893,076 A | 4/1999 | Hafner et al. | |
| 5,894,554 A | 4/1999 | Lowery et al. | |
| 5,897,622 A | 4/1999 | Blinn et al. | |
| 5,897,629 A | 4/1999 | Shinagawa et al. | |
| 5,899,088 A | 5/1999 | Purdum | |
| 5,910,896 A | 6/1999 | Hahn-Carlson | |
| 5,918,213 A | 6/1999 | Bernard et al. | |
| 5,922,040 A | 7/1999 | Prabhakaran | |
| 5,943,652 A | 8/1999 | Sisley et al. | |
| 5,943,841 A | 8/1999 | Wunscher | |
| 5,949,776 A | 9/1999 | Mahany et al. | |
| 5,956,709 A | 9/1999 | Xue | |
| 5,960,411 A | 9/1999 | Hartman et al. | |
| 5,961,601 A | 10/1999 | Iyengar | |
| 5,963,919 A | 10/1999 | Brinkley et al. | |
| 5,974,401 A | 10/1999 | Enomoto et al. | |
| 5,979,757 A | 11/1999 | Tracy et al. | |
| 5,983,200 A | 11/1999 | Slotznick | |
| 5,987,377 A | 11/1999 | Westerlage et al. | |
| 5,991,739 A | 11/1999 | Cupps et al. | |
| 5,999,914 A | 12/1999 | Blinn et al. | |
| 6,003,015 A | 12/1999 | Kang et al. | |
| 6,006,100 A | 12/1999 | Koenck et al. | |
| 6,016,504 A | 1/2000 | Arnold et al. | |
| 6,023,683 A | 2/2000 | Johnson et al. | |
| 6,026,378 A | 2/2000 | Onozaki | |
| 6,058,417 A | 5/2000 | Hess et al. | |
| 6,061,607 A | 5/2000 | Bradley et al. | |
| 6,070,147 A | 5/2000 | Harms et al. | |
| 6,073,108 A | 6/2000 | Peterson | |
| 6,081,789 A | 6/2000 | Purcell | |
| 6,083,279 A | 7/2000 | Cuomo et al. | |
| 6,084,528 A | 7/2000 | Beach et al. | |
| 6,085,170 A | 7/2000 | Tsukuda | |
| 6,087,952 A | 7/2000 | Prabhakaran | |
| 6,088,648 A | 7/2000 | Shah et al. | |
| 6,094,642 A | 7/2000 | Stephenson et al. | |
| 6,101,481 A | 8/2000 | Miller | |
| 6,101,486 A | 8/2000 | Roberts et al. | |
| 6,123,259 A | 9/2000 | Ogasawara | |
| 6,140,922 A | 10/2000 | Kakou | |
| 6,144,848 A | 11/2000 | Walsh et al. | |
| 6,157,945 A | 12/2000 | Balma et al. | |
| 6,167,380 A * | 12/2000 | Kennedy et al. | 705/10 |
| 6,167,382 A | 12/2000 | Sparks et al. | |
| 6,182,053 B1 | 1/2001 | Rauber et al. | |
| 6,185,625 B1 | 2/2001 | Tso et al. | |
| 6,215,952 B1 | 4/2001 | Yoshio et al. | |
| 6,233,543 B1 | 5/2001 | Butts et al. | |
| 6,236,974 B1 * | 5/2001 | Kolawa et al. | 705/7 |
| 6,249,773 B1 | 6/2001 | Allard | |
| 6,249,801 B1 | 6/2001 | Zisapel et al. | |
| 6,260,024 B1 | 7/2001 | Shkedy | |
| 6,275,812 B1 | 8/2001 | Haq et al. | |
| 6,289,260 B1 | 9/2001 | Bradley et al. | |
| 6,289,370 B1 | 9/2001 | Panarello et al. | |
| 6,292,784 B1 | 9/2001 | Martin et al. | |
| 6,324,520 B1 | 11/2001 | Walker et al. | |
| 6,332,334 B1 | 12/2001 | Faryabi | |
| 6,341,269 B1 | 1/2002 | Dulaney et al. | |
| 6,343,275 B1 | 1/2002 | Wong | |
| 6,397,246 B1 | 5/2002 | Wolfe | |
| 6,405,173 B1 | 6/2002 | Honarvar et al. | |
| 6,424,947 B1 | 7/2002 | Tsuria et al. | |
| 6,438,652 B1 | 8/2002 | Jordan et al. | |
| 6,445,976 B1 | 9/2002 | Ostro | |
| 6,453,306 B1 | 9/2002 | Quelene | |
| 6,463,345 B1 | 10/2002 | Peachey-Kountz et al. | |
| 6,463,420 B1 | 10/2002 | Guidice et al. | |
| 6,484,150 B1 | 11/2002 | Blinn et al. | |
| 6,490,567 B1 | 12/2002 | Gregory | |
| 6,505,093 B1 | 1/2003 | Thatcher et al. | |
| 6,526,392 B1 | 2/2003 | Dietrich et al. | |
| 6,530,518 B1 | 3/2003 | Krichilsky et al. | |
| 6,549,891 B1 | 4/2003 | Rauber et al. | |
| 6,567,786 B1 | 5/2003 | Bibelnieks et al. | |
| 6,571,213 B1 | 5/2003 | Altendahl et al. | |
| 6,578,005 B1 | 6/2003 | Lesaint et al. | |
| 6,587,827 B1 * | 7/2003 | Hennig et al. | 705/1 |
| 6,594,641 B1 | 7/2003 | Southam | |
| 6,595,342 B1 | 7/2003 | Maritzen et al. | |
| 6,598,024 B1 | 7/2003 | Walker et al. | |
| 6,598,027 B1 | 7/2003 | Breen, Jr. | |
| 6,622,127 B1 | 9/2003 | Klots et al. | |
| 6,654,726 B1 | 11/2003 | Hanzek | |
| 6,697,964 B1 | 2/2004 | Dodrill et al. | |
| 6,741,995 B1 | 5/2004 | Chen et al. | |
| 6,748,318 B1 | 6/2004 | Jones | |
| 6,748,418 B1 | 6/2004 | Yoshida et al. | |
| 6,763,496 B1 | 7/2004 | Hennings et al. | |
| 6,792,459 B2 | 9/2004 | Elnozahy et al. | |
| 6,862,572 B1 | 3/2005 | de Sylva | |
| 6,873,970 B2 | 3/2005 | Showghi et al. | |
| 6,879,965 B2 | 4/2005 | Fung et al. | |
| 6,904,455 B1 | 6/2005 | Yen | |
| 6,970,837 B1 | 11/2005 | Walker et al. | |
| 6,975,937 B1 | 12/2005 | Kantarjiev et al. | |
| 6,980,962 B1 | 12/2005 | Arganbright et al. | |

| | | | |
|---|---|---|---|
| 6,990,460 | B2 | 1/2006 | Parkinson |
| 7,010,501 | B1 | 3/2006 | Roslak et al. |
| 7,028,187 | B1 | 4/2006 | Rosen |
| 7,035,914 | B1 | 4/2006 | Payne et al. |
| 7,040,541 | B2 | 5/2006 | Swartz et al. |
| 7,085,729 | B1 * | 8/2006 | Kennedy et al. ............ 705/10 |
| 7,139,637 | B1 | 11/2006 | Waddington et al. |
| 7,139,721 | B2 | 11/2006 | Borders et al. |
| 7,177,825 | B1 | 2/2007 | Borders et al. |
| 7,197,547 | B1 | 3/2007 | Miller et al. |
| 7,222,161 | B2 | 5/2007 | Yen et al. |
| 7,233,914 | B1 | 6/2007 | Wijaya et al. |
| 7,240,283 | B1 | 7/2007 | Paila et al. |
| 7,251,612 | B1 | 7/2007 | Parker et al. |
| 7,308,423 | B1 | 12/2007 | Woodward et al. |
| 7,346,564 | B1 | 3/2008 | Kirklin et al. |
| 7,383,233 | B1 | 6/2008 | Singh et al. |
| 7,792,712 | B2 | 9/2010 | Kantarjiev et al. |
| 2001/0013007 | A1 | 8/2001 | Tsukuda |
| 2001/0037229 | A1 | 11/2001 | Jacobs et al. |
| 2001/0042021 | A1 | 11/2001 | Matsuo et al. |
| 2001/0042050 | A1 | 11/2001 | Fletcher et al. |
| 2001/0047285 | A1 | 11/2001 | Borders et al. |
| 2001/0047310 | A1 | 11/2001 | Russell |
| 2001/0049619 | A1 | 12/2001 | Powell et al. |
| 2001/0049672 | A1 | 12/2001 | Moore |
| 2002/0002513 | A1 | 1/2002 | Chiasson |
| 2002/0004766 | A1 | 1/2002 | White |
| 2002/0007299 | A1 | 1/2002 | Florence |
| 2002/0010633 | A1 | 1/2002 | Brotherson |
| 2002/0013950 | A1 | 1/2002 | Tomsen |
| 2002/0038224 | A1 | 3/2002 | Bhadra |
| 2002/0038261 | A1 | 3/2002 | Kargman et al. |
| 2002/0050526 | A1 | 5/2002 | Swartz et al. |
| 2002/0065700 | A1 | 5/2002 | Powell et al. |
| 2002/0072994 | A1 | 6/2002 | Mori et al. |
| 2002/0103724 | A1 | 8/2002 | Huxter |
| 2002/0116279 | A1 | 8/2002 | Nobilio |
| 2002/0188530 | A1 | 12/2002 | Wojcik et al. |
| 2002/0194084 | A1 | 12/2002 | Surles |
| 2003/0045340 | A1 | 3/2003 | Roberts |
| 2003/0065565 | A1 | 4/2003 | Wagner et al. |
| 2003/0079227 | A1 | 4/2003 | Knowles et al. |
| 2003/0119485 | A1 | 6/2003 | Ogasawara |
| 2003/0233190 | A1 | 12/2003 | Jones |
| 2004/0107125 | A1 | 6/2004 | Guheen et al. |
| 2005/0027580 | A1 | 2/2005 | Crici et al. |
| 2005/0144641 | A1 | 6/2005 | Lewis |
| 2007/0016463 | A1 | 1/2007 | Borders et al. |
| 2007/0055580 | A1 | 3/2007 | Woodward et al. |
| 2007/0112647 | A1 | 5/2007 | Borders et al. |
| 2007/0136149 | A1 | 6/2007 | Woodward et al. |
| 2007/0162353 | A1 | 7/2007 | Borders et al. |
| 2007/0174144 | A1 | 7/2007 | Borders et al. |
| 2009/0083439 | A1 | 3/2009 | Rauser et al. |
| 2009/0150534 | A1 | 6/2009 | Miller et al. |

FOREIGN PATENT DOCUMENTS

| | | |
|---|---|---|
| FR | 2696722 | 4/1994 |
| GB | 2 265 032 A | 9/1993 |
| WO | WO99/07121 | 2/1999 |
| WO | WO 99/09508 | 2/1999 |

OTHER PUBLICATIONS

Anon, Automatic ID News, "20/20 Results Achieved with Technology Trio", Sep. 1995, p. 19.

Anon, PC Foods, "Customer Service Agreement," printed from website: http://www.pcfoods.com, Abstract No. XP-002245026, 1999, pp. 1-2.

Anupindi et al., "Estimation of Consumer Demand with Stock-Out Based Substitution: An Application to Vending Machine Product", Marketing Science, vol. 17, No. 4, 1998, pp. 406-423.

Fielding et al., "Hypertext Transfer Protocol—HTTP/1.1, RFC 2616", Network Working Group, Jun. 1999, pp. 1-90.

Fynes, Brian, et al, The Impact of Electronic Data Interchange on Competitiveness in Retail Supply Chain, IBAR vol. 14 No. 2 pp. 16-2 1993.

Hyten, Todd, "Stop & Shop mulls online grocery store", Boston Business Journal (Boston, MA, US), Mar. 22, 1996, vol. 16, No. 6, p. 1.

Kawata, Hiroo, "Information Technology of Commercial Vehicles in the Japanese Parcel Service Business," Abstract No. XP-000560489, 1992, pp. 371-382.

Koster, Rene de, "Routing Orderpickers in a Warehouse: A Comparison Between Optimal and Heuristic Solutions," IIE Transactions, vol. 30, No. 5, p. 469, May 1998.

Maloney, David, "The New Corner Drugstore", May 1, 2000, Modern Materials Handling, vol. 55, No. 5, p. 58.

Norton, Tim R., "End-To-End Response-Time: Where to Measure?", Computer Measurement Group Conference Proceedings, CMG99 Session 423, Dec. 1999, pp. 1-9.

www.peapod.com, including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.

"Peapod Interactive Grocery Shopping and Delivery Service Now Delivers Via the Internet", Press Release, peapod.com, Apr. 22, 1996, pp. 1-2.

Pearce, Michael R. "From carts to clicks", Ivey Business Quarterly, Autumn 1998, vol. 63, No. 1, p. 69-71.

Sekita, Takashi, "The Physical Distribution Information Network in the Home-Delivery Business," Japan Computer Quarterly, Abstract No. XP-00.431194, 1990, pp. 23-32.

Smith et al., "Management of Multi-Item Retail Inventory Systems with Demand Substitution", Operations Research, vol. 48, No. 1, January-February, pp. 50-64.

Towie, Henry, "On the Fast Track with Totaltracks: UPS Deploys Mobile Date Service," Abstract No. XP-000560076, Document Delivery World, vol. 9, No. 3, 1993, pp. 30-31.

Van Den Berg, Jeroen, P, "A Literature Survey on Planning and Control of Warehousing Systems", IIE Transactions vol. 31, No. 3, p. 751, Aug. 1999.

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Worth Wren Jr., Fort Worth Star-Telegram Texas, "Albertson's Expects Online Grocery Shopping to Boom", KRTBN Knight-Ridder Tribune Business News (Fort Worth Star-Telegram, Texas), Nov. 9, 1998.

Wunnava et al., "Interactive Multimedia on the World Wide Web", IEEE, Aug. 1999, pp. 110-115.

U.S. Appl. No. 09/568,570, filed May 10, 2000.
U.S. Appl. No. 09/568,571, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/620,199, filed Jul. 20, 2000.
U.S. Appl. No. 09/750,385, filed Dec. 27, 2000.
U.S. Appl. No. 09/792,400, filed Feb. 22, 2001.
U.S. Appl. No. 09/813,235, filed Mar. 19, 2001.
U.S. Appl. No. 11/244,627, filed Oct. 5, 2005.
U.S. Appl. No. 11/191,413, filed Jul. 27, 2005.
U.S. Appl. No. 11/356,870, filed Feb. 18, 2006.

Jaffe, Charles A. "Gas supplier takes timing seriously if deliveries are late, the product is free," The Morning Call, Allentown, PA, Feb. 5, 1989, pp. 1-4.

Parker, Rachel, "UPS Pioneers a cellular data network", InfoWorld, ABI/INFORM Global, Jun. 8, 1992, p. S59-S60.

U.S. Appl. No. 11/818,010, filed Jun. 13, 2007.
U.S. Appl. No. 12/074,283, filed Mar. 3, 2008.

Hoffman, Thomas, "New UPS CIO eyes cyberdelivery," Computerworld, Nov. 11, 1996, 30, 46; ABI/INFORM Global, p. 4.

"Imposing an Objective Viewpoint," Modern Purchasing, vol. 36, Iss. 3, Mar. 1994, pp. 1-4.

"New Medium, new message," The Economist, vol. 329, Iss. 7834, Oct. 23, 1993, p. S 16, pp. 1-5.

Booker, et al. "Up in the air", Computerworld, Oct. 11, 1993; 27, 41; ABI/INFORM Global, p. 54.

Alba et al., "Interactive home shopping: Consumer, retailer, and manufacturer incentives to participate in electronic marketplaces", Journal of Marketing, vol. 61, No. 3, Jul. 1, 1997, 18 pgs.

Bloch et al., "On the Road of Electronic Commerce—a Business Value Framework, Gaining Competitive Advantage and Some Research Issues", Mar. 1996, 20 pages.

Brown Janelle, "Pod People Peapod, the online grocery service, sounds great—but can it deliver?" Salon Media Group, Inc., Dec. 17, 1998, 3 pages.

Corcoran, Cathy, "The Skeptic's Guide to on-line shopping. Who has time to shop for groceries? So we gave Peapod a test run." The Patriot Ledger, Quincy, MA, Jul. 7, 1997, 4 pages.

Descartes Licenses Energy V6 Supply Chain Suite to Major Pepsi Bottler . . . News Release, Descartes Systems Group Inc., Waterloo Ontario, Aug. 27, 1998, 2 pages.

Dilger, Karen Abramic, "Warehouse Wonders", Manufacturing Systems, vol. 15, No. 2, 1 Feb. 1997, 4 pages.

Dyson et al., "Electronic Delivery without the Internet (Digital Delivery of Newspapers)", The Seybold Report on Publishing Systems, vol. 25, No. 1, ISBN: 0736-7260, Sep. 1, 1995, 9 pages.

Eckerson, Wayne, "Grocers put stock in EDI to streamline deliveries; New electronic data interchange systems offer a wealth of benefits for retailers and suppliers," Network World, Inc., Aug. 7, 1989, 2 pages.

First Stop—Main Menu, website tour, Peapod, http://web.archive.org/web/19961113150913/www.peapod.com/tour1.html, Nov. 13, 1996, 13 pages.

Frequently Asked Questions, webpages, Peapod, http://web.archive.org/web/19961113150832/www.peapod.com/question.html, Nov. 13, 1996, 2 pages.

"Here's How Peapod Works," webpages, Peapod, http://web.archive.org/web/19961113151243/www.peapod.com/work.html, Nov. 13, 1996, 2 pages.

"Installation and Shopping Tips for the Mac," Peapod Video, 1993, 1 page.

"Introduction to Peapod," webpages, Peapod, http://web.archive.org/web/19961113145506/www.peapod.com/intro.html, Nov. 13, 1996, 2 pages.

Ives et al., "The Information System as a Competitive Weapon", Communications of the ACM, vol. 27, No. 12, Dec. 1984. 9 pages.

Maeglin, Kathy, "Services Take the 'Shop' Out of Shopping for Groceries", The Capital Times, Mar. 20, 1997, 2 pages.

Mai et al., "Consumers' Perceptions of Specialty Foods and the Rural Mail Order Business", 52nd EAAE Seminar - Parma, Jun. 19-21, 1997, pp. 331-348.

Malone et al., "Computers, Networks, and The Corporation," Center for Information Systems Research, MIT, Aug. 1991, 14 pages.

Marsh, Barbara, "Peapod's On-Line Grocery Service Checks Out Success - Customers Shop Electronic Aisles; Finicky Workers Sack the Goods", The Wall Street Journal, Jun. 30, 1994, 2 pages.

Meeker et al., The Internet Retailing Report, U.S. Investment Research, Morgan Stanley, May 28, 1997, 241 pages.

Menzies, David, "Checking out the aisles by computer: Cori Bonina, General Manager of Stong's market in Vancouver, has made a virtual success of a meat-and-potatoes business", National Post, Dec. 1, 1998, 2 pages.

"More Information," webpages, Peapod http://web.archive.org/web/19961113145540/www.peapod.com/more.html, Nov. 13, 1996, 2 pages.

"Online Groceries, A Quicker Shopping Cart?" E-Commerce Customers - What, Where and Why They Buy, Standard Media Inc. and Odyssey, LP, Spring 2000, 19 pages.

Patterson, Rebecca H., "No Lines at Britain's First On-Line Grocery Store, but You Still May Wait", The Wall Street Journal Europe, Jul. 25, 1997, 3 pages.

Peapod, Inc., Telephone Grocery Shopping Guide, Aug. 7, 1992, 3 introductory pages and pp. 1-12.

Podmolik, Mary Ellen, "Groceries Seeing Green From Computer Shopping", Chicago Sun-Times, May 8, 1996, 1 page.

Poirier, Charles et al., Supply Chain Optimization, Building the Strongest Total Business Network, Berrett-Koehler Publishers, San Francisco, Copyright 1996, 30 pages.

Purpura, Linda, "Getting to House from Order Smooth Transitions from Order, To Pick, To Pack, To Delivery, are a Vital Part of a Successful Home-Shopping Program", Supermarket News, Oct. 6, 1997, 2 pages.

Reynolds, Janice, "Logistics and Fulfillment for E-Business", ISBN: 1-578200741, 2001, 60 pages.

"Shopping-Virtually Hassle-Free", Computer Weekly, Apr. 10, 1997, 2 pages.

Smart Shopping for Busy People, webpage, Peapod, http://web.archive.org/web/19961113145048/www.peapod.com/ Nov. 11, 1996, 1 page.

User Manual, Peapod, Inc., Version 3.10, Aug. 7, 1992, 83 pages.

Van Mieghem, Jan A., "Peapod: Mass Customized Service", Kellogg School of Management, Northwestern University, Aug. 28, 2001 (Rev. Nov. 22, 2004), 13 pages.

Chandler, Susan. "The grocery cart in your PC," Business Week, Iss. 3441, 1995, p. 63, 2 pages.

eShopper: Resources for Web Buyeing. Savetz, Kevin; Gardiner, Peace, Computer Shopper, 19, 5, 280(1), May 1999.

Dialog Search Results, re: U.S. Appl. No. 11/705,982 dated Sep. 13, 2010, pp. 1-54.

Restriction Requirement for U.S. Appl. No. 09/568,614 dated May 9, 2002.

Office Action for U.S. Appl. No. 09/568,614 dated Jul. 29, 2002.

Office Action for U.S. Appl. No. 09/568,614 dated Feb. 24, 2003.

Advisory Action for U.S. Appl. No. 09/568,614 dated Apr. 21, 2003.

Saccomano, Ann, "Blue Laws" Still Apply, Traffic World, Logistics, p. 15, Aug. 23, 1999, 2 pages.

* cited by examiner

| SKU ID | Availability Time | Available Quantity | Reserved Quantity |
|--------|-------------------|--------------------|-------------------|
| 0001   | 1/1/1900          | 100                |                   |
| 0001   | 2/14/2000         |                    | 25                |
| 0001   | 2/15/2000         |                    | 30                |
| 0001   | 2/16/2000         | 50                 | 10                |
| 0001   | 2/17/2000         |                    | 20                |
| 0001   | 2/18/2000         |                    | 5                 |
| 0001   | 2/19/2000         | 20                 | 15                |

Fig. 5

REAL-TIME DISPLAY OF AVAILABLE PRODUCTS OVER THE INTERNET

RELATED APPLICATION DATA

This application is a continuation under 35 USC 120 of U.S. patent application Ser. No. 11/705,982, filed Feb. 12, 2007, entitled ONLINE STORE PRODUCT AVAILABILITY, which is a continuation under 35 USC 120 of U.S. patent application Ser. No. 09/568,603, filed May 10, 2000, entitled INTEGRATED SYSTEM FOR ORDERING, FULFILLMENT, AND DELIVERY OF CONSUMER PRODUCTS USING A DATA NETWORK, now U.S. Pat. No. 7,177,825, the entirety of which is incorporated herein by reference for all purposes, which claims priority under 35 USC 119(e) from U.S. Provisional Patent Application No. 60/133,646, filed May 11, 1999, entitled ELECTRONIC COMMERCE ENABLED DELIVERY SYSTEM AND METHOD the entirety of which is incorporated herein by reference for all purposes.

The present application also relates to a number of commonly assigned, earlier filed U.S. patent applications including: (1) U.S. patent application Ser. No. 09/568,570 for INVENTORY REPLICATION BASED UPON ORDER FULFILLMENT RATES, filed May 10, 2000 now U.S. Pat. No. 7,370,005; (2) U.S. patent application Ser. No. 09/568,614 for REAL-TIME DISPLAY OF AVAILABLE PRODUCTS OVER THE INTERNET, filed May 10, 2000; (3) U.S. patent application Ser. No. 09/568,572, filed May 10, 2000, (now U.S. Pat. No. 6,975,937) for TECHNIQUE FOR PROCESSING CUSTOMER SERVICE TRANSACTIONS AT CUSTOMER SITE USING MOBILE COMPUTING DEVICE; (4) U.S. patent application Ser. No. 09/568,823, filed May 10, 2000, (now U.S. Pat. No. 7,197,547) for LOAD BALANCING TECHNIQUE IMPLEMENTED IN A DATA NETWORK DEVICE UTILIZING A DATA CACHE; (5) U.S. patent application Ser. No. 09/568,569, filed May 10, 2000, (now U.S. Pat. No. 6,622,127) for ORDER ALLOCATION TO SELECT FROM INVENTORY LOCATIONS STOCKING FEW UNITS OF INVENTORY; (6) U.S. patent application Ser. No. 09/566,912, filed May 9, 2000, (now U.S. Pat. No. 6,332,334) for METHOD AND APPARATUS FOR HANDLING AND TRANSPORTING TEMPERATURE-SENSITIVE ITEMS; (7) and U.S. patent application Ser. No. 09/568,571, filed May 10, 2000, (now U.S. Pat. No. 7,139,637) for ORDER ALLOCATION TO MINIMIZE CONTAINER STOPS IN A DISTRIBUTION CENTER. Each of the disclosures of these copending applications is incorporated herein by reference in its entirety for all purposes.

BACKGROUND OF THE INVENTION

The present invention relates to the field of electronic commerce. In particular, the invention relates to a technique for selling and delivering consumer products to customers using a data network. Still more specifically, the present invention provides methods and apparatus by which availability information for a plurality of products is provided in real-time via the Internet.

Electronic commerce via the Internet is rapidly changing the way in which products and services are purchased by and delivered to consumers. An important challenge faced by most businesses relates to ensuring that sufficient inventory is available to respond to consumer demand for advertised products. This problem is exacerbated by the high speed and the level of automation which characterizes e-commerce. That is, because the number of customer orders is not limited in the same way as it is, for example, in brick-and-mortar retail sites, it is difficult for conventional inventory distribution channels to anticipate and match the demand for specific products.

In addition, because of the static way in which most e-commerce sites present information to consumers, items for which inventory has been depleted are often presented as available to a consumer until an attempt is made to place an order for such items. Such systems typically respond with apologetic messages stating that the selected item is not currently in stock. Worse still, some systems do not even have mechanisms by which consumers are notified that specific items are currently unavailable. For the frequent Internet shopper, typically an individual for whom instant response is expected, this is a frustrating experience, especially to the extent that it occurs repeatedly.

In view of the foregoing, there is a need for techniques which allow e-commerce sites to provide up-to-date availability information to consumers. Such techniques will be crucial to the success of the businesses which adopt the electronic paradigm.

SUMMARY OF THE INVENTION

According to the present invention, techniques are provided by which up-to-date availability information relating to products presented by an e-commerce site is communicated to consumers in real time. Once a consumer has selected a delivery date, any products selected for viewing by that consumer are presented to the consumer according to availability information associated with the selected products. According to a specific embodiment, the availability information for a particular product is determined with reference to the selected delivery date and up-to-date inventory information. According to various embodiments, this inventory information may relate to current physical inventory, expected inventory shipments, and currently reserved, currently ordered items, as well as a variety of other parameters.

When a consumer selects products for viewing in the customer interface of an e-commerce site designed according to the present invention, representations of each selected product are presented in accordance with the products' availability information. For some of these products, the availability information is determined with reference to the information discussed above. For selected ones of these, the availability information is also determined with reference to additional parameters such as, for example, a holiday date (e.g., for seasonal items), or an expiration date (e.g., for items with limited shelf life). For others, the availability of the product is assumed because either the product is always available, or the delivery date is far enough out that the product is determined to be reliably available by that time.

In any case, a representation of a specific product may be presented with the availability information explicit. For example, for products which are not available for the selected delivery date, information presented with the product representation would indicate that the product is not currently available, or that the product will be available on a later date. Products which are determined to be available but only for a limited period of time would indicate, for example, that the product is available until a specific date.

According to a specific embodiment of the invention, a particular consumer's order may be divided into multiple orders with different delivery dates where it includes items which have been determined not to be available by the delivery date specified by the consumer. According to one such embodiment, where the consumer has selected a number of items for an order and subsequently selects a delivery date, any of the selected items determined not to be available on the selected date are placed in another order which is then assigned a date upon which such items will be available for delivery. According to another such embodiment, when a consumer attempts to select an item which is indicated as unavailable on a previously specified delivery date, that item is placed in a separate order for a later date upon which the item will be available for delivery.

Thus, the invention provides computer implemented methods and apparatus for providing availability information for a plurality of products via a network. The availability information for each of the plurality of products is determined with reference to inventory data and a delivery date specified by a remote user. The availability information is then communicated to the user via the network.

According to a specific embodiment, methods and apparatus are provided for scheduling delivery of a plurality of products via a network. A first delivery date is received from a user via the network. Availability information for each of the plurality of products is determined with reference to inventory data and the first delivery date. Delivery of a first subset of the plurality of products is scheduled for the first delivery date, the availability information indicating that each of the first subset of products is available on the first delivery date. The user is enabled to schedule delivery of a second subset of the plurality of products for a second delivery date subsequent to the first delivery date, the availability information indicating that each of the second subset of products is unavailable on the first delivery date and available on the second delivery date.

According to another specific embodiment of the present invention, methods and apparatus are provided for determining availability information for a first one of a plurality of products for publication via a wide area network. The availability information is calculated with reference to a delivery date, an available number of units, and a reserved number of units, the delivery date having been specified by a user via the network, the available number of units having been determined with reference to inventory information, and the reserved number of units having been determined with reference to current order information.

A further understanding of the nature and advantages of the present invention may be realized by reference to the remaining portions of the specification and the drawings.

BRIEF DESCRIPTION OF THE DRAWINGS

FIG. 5 is an example of a table in which availability information is stored.

DETAILED DESCRIPTION OF SPECIFIC EMBODIMENTS

Figure 1:
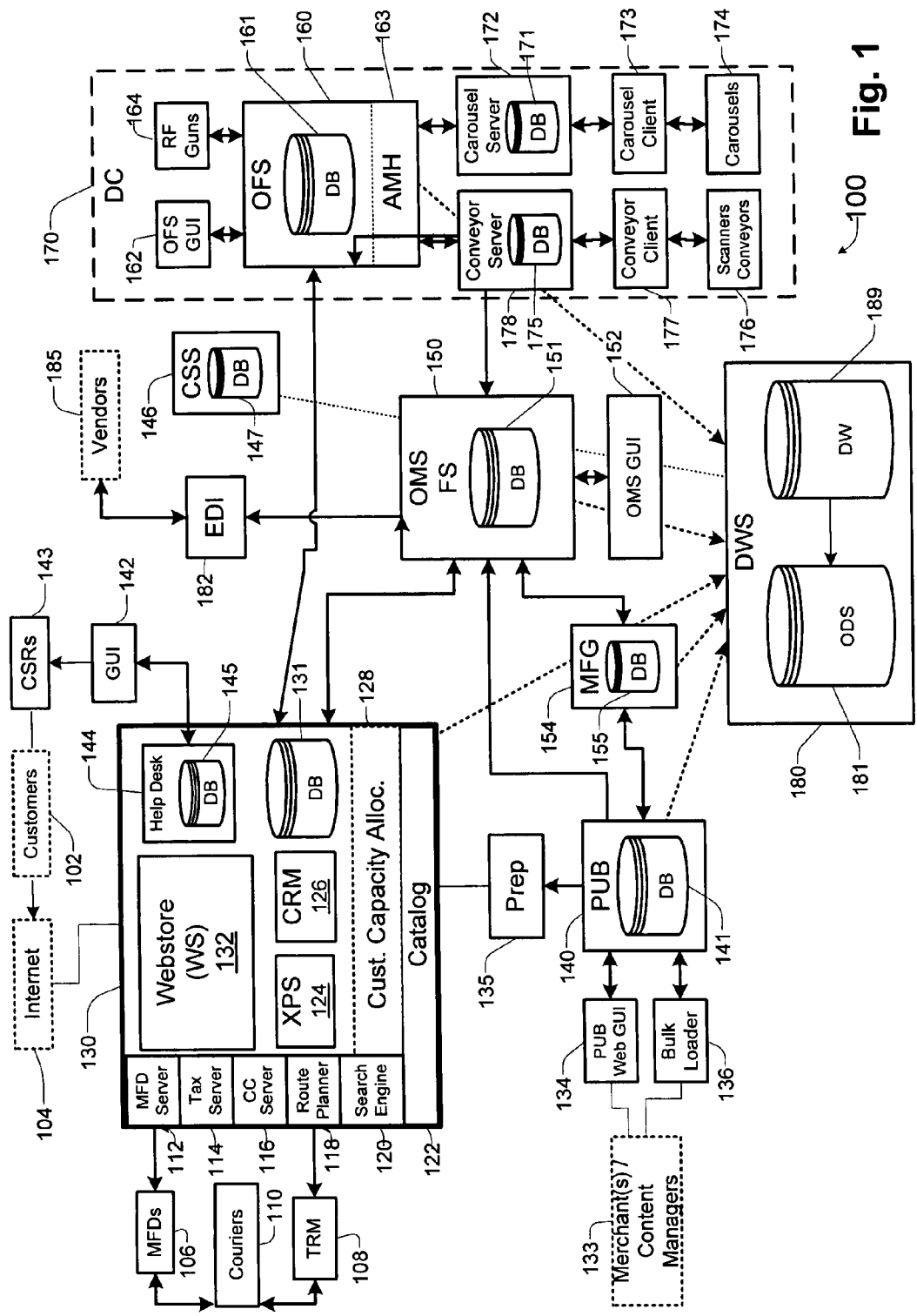
FIG. 1 is a block diagram of an integrated system architecture designed according to a specific embodiment of the present invention.

FIG. 1 shows a schematic block diagram illustrating various systems, subsystems and/or components of an integrated system architecture 100 for use with a specific embodiment of the present invention. The system of FIG. 1 as well as other systems which may be used in conjunction with the present invention are described in greater detail in copending U.S. patent application Ser. No. 09/568,603 for INTEGRATED SYSTEM FOR ORDERING, FULFILLMENT, AND DELIVERY OF CONSUMER PRODUCTS USING A DATA NETWORK incorporated by reference above. As shown in FIG. 1, system 100 includes a plurality of subsystems and other components for effecting electronic commerce over a data network. It will be understood that portions of the various subsystems described herein are embodied in computer program instructions stored in corresponding computer-readable media. A brief description of at least a portion of the plurality of subsystems of system 100 is presented below. System 100 of FIG. 1 includes:

(1) a Publishing (PUB) Subsystem 140 which manages SKU and catalog information (e.g. SKUs, UPCs, products, categories, descriptive attributes, etc.), and provides an interface to merchants 133;

(2) a Webstore Subsystem (WS) 132 which manages the on-line store interface with customers, including customer shopping and ordering transactions;

(3) a Transportation Subsystem (XPS) 124 which manages delivery window scheduling, delivery vehicle routing, capacity planning, and mobile field device (MFD) data used by delivery couriers;

(4) an Order Management Subsystem (OMS) 150 which manages pricing data, item availability data, inventory data, vendor data, finance, procurement, etc;

(5) an Order Fulfillment Subsystem (OFS) 160 which facilitates the fulfillment of customer orders and manages the distribution center (170) operations; and (6) a Customer Relationship Management (CRM) Subsystem 126 for enabling customer service representatives (CSRs) 143 to service customer requests and track customer interaction.

According to specific embodiments, each subsystem may also comprise at least one server and/or other components. Further, each subsystem may be configured to utilize a dedicated or shared database server as its persistent and transactional data backbone. Users or customers may access data stored on one of the subsystem's database servers (e.g. Webstore database), which then executes appropriate business logic and/or business objects.

Each subsystem may be configured or designed to communicate with each other via a plurality of interfaces. According to a specific embodiment, the plurality of interfaces includes both synchronous and asynchronous interfaces. Many of the various system interfaces are configured to be asynchronous, wherein data is typically transferred in batch mode via staging (e.g. database) tables or flat files (e.g., separated value files). However, at least a portion of the system interfaces are configured as synchronous interfaces. Generally, a synchronous interface may be used where an immediate response from a server or component is required.

Conceptually, system 100 of FIG. 1 may be grouped into two general subsystems, namely a Front Office system and a Back Office system. The Front Office system is generally responsible for functions related to customer transactions such as, for example, customer orders, billing transactions, delivery scheduling, customer service, etc. In the embodiment of FIG. 1, for example, the Front Office system 130 comprises the Webstore Subsystem 132, Transportation Subsystem 124, and Customer Relationship Management Subsystem 126. The Front Office system 130 may also include other subsystems or components such as, for example, mobile field device (MFD) components 112, a tax component 114, a billing component 116, a delivery route planning component 118, a search engine 120, a catalog component 112, a Help Desk component 114, a customer capacity allocation component 128, etc.

Additionally, the Front Office system 130 may include a centralized database 131 which may be accessed by subsystems and/or components of system 100. Alternatively, one or more of the Front Office systems and/or components may each comprise a respective database which is accessible by other subsystems and/or components of system 100.

The Back Office system generally includes all subsystems and/or components which are not part of the Front Office system. Thus, as shown in FIG. 1, for example, the Back Office system includes the PUB 140, OMS 150, and OFS 160 subsystems. However, the invention is not limited to the particular embodiment shown in FIG. 1, and it will be appreciated that the specific configuration of system 100 may be modified by one having ordinary skill in the art to suit specific applications.

As shown in FIG. 1, the Front Office 130 comprises a plurality of separate subsystems such as, for example, Webstore Subsystem (WS) 132, Transportation Subsystem (XPS) 124, and Customer Relationship Management (CRM) Subsystem 126. Each subsystem may be implemented via a combination of hardware and/or software, and further may include a plurality of different functional components, modules, and/or plug-in applications.

At least a portion of the software residing at the Front Office system may include a presentation layer, an application layer, a business object layer, a database access layer, or any combination thereof. According to a specific embodiment, the presentation layer handles the actual presentation of information to users via an appropriate medium. The application layer handles the appropriate application logic for the various subsystems of the Front Office. For example, in the Webstore Subsystem 132, it is the application layer (referred to as the shopping engine) which determines that a customer cannot check out an order unless the customer has selected a delivery window, or provided billing information. The business object layer (referred to as the BOBO—Bucket Of Business Objects) provides objects with a fixed set of functionality (e.g. methods or procedures) that may be manipulated by the application layer. According to a specific embodiment, the business objects do not know about each other, and the application layer handles the coordination between the various business objects. The database access layer provides connectivity and data access APIs to the Front Office database 131 (also referred to as the Webstore database). According to a specific embodiment, the database 131 is implemented as a shared database which may be accessed by each of the Front Office systems. According to another specific embodiment, the database access layer performs pooling and caching of connection objects, where appropriate.

The Webstore Subsystem (WS) 132 provides an interface for enabling customers to access the on-line store (e.g. Webstore). In a specific embodiment where the Webstore is implemented as a web site on the World Wide Web, customers may access the Webstore via the Internet or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the web site. According to a specific embodiment, the Webstore interface is implemented using a secure http protocol (HTTPS), commonly known to those skilled in the art.

In accordance with a specific embodiment, the Webstore Subsystem 132 supports a number of customer related features such as, for example, self registration; accessing of customer account information; browsing of product categories and category hierarchy; viewing of product images and product information; key word searches; delivery scheduling; accessing of customer order history; customizable shopping lists; on-line shopping and ordering; etc.

The Webstore Subsystem (referred to as the Webstore) may be implemented using at least one server which is connected to the data network. According to a specific embodiment, the Webstore is implemented using a plurality of web servers (e.g. web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing the Front Office database via the data network.

According to a specific implementation, the presentation layer of the WS software is implemented in ASP, which generates HTML data that is sent back to the customer browser. The application software layer or shopping engine layer may be implemented as COM objects. The business object layer of the software may provide the following business objects: (1) a customer object which implements customer functionality and attributes; (2) a catalog object which implements the product category hierarchy, SKUs, price, and available-to-promise (ATP) information; (3) an order object which implements the shopping cart, order management, billing, and check-out procedures; (4) a session object which implements state over HTTP; and (5) a delivery object which implements customer delivery scheduling. Further, the WS is preferably configured or designed to minimize customer response time and to provide for scalability.

Additionally, as shown in FIG. 1, the Front Office system may include a number of integrated components which provide additional functionality. For example, the WS may include a plurality of components which provide additional functionality such as, for example, computation of taxes, search capability, credit card billing, etc. Thus, as shown in FIG. 1, for example, the WS 132 includes at least one catalog component 122; a tax computation component 114 for computing taxes for each order line item that is sold; a search component 120 for processing text search requests; and a credit (or debit) card server (CC) component 116 for handling credit and/or debit card authorizations and funds captures. According to at least one embodiment, one or more of these components may be implemented as an asynchronous process in order to reduce or minimize impact on the Webstore server's response time and availability.

The Transportation Subsystem (XPS) 124 generally handles delivery window scheduling, delivery vehicle routing, capacity planning, and mobile field device programming used by delivery couriers. Accordingly, the Transportation Subsystem may be configured to provide the following functional features: (1) delivery scheduling, and delivery window reservation; (2) deliveries to customer sites with appropriate billing actions and processing, including processing of adjustments, credits, and returns; and (3) adjusting delivery operation parameters such as, for example, truck route plans, delivery vehicle usage, service duration, parking time, delivery courier scheduling, data to be downloaded into MFDs, etc.

As shown in FIG. 1, for example, the Transportation Subsystem 124 may comprise a plurality of components and/or other subsystems including, Route Planner 118, MFD server 112, mobile field devices 106, transportation resource management (TRM) software 108, couriers 110, and customer capacity allocator 128. In alternate embodiments, at least a portion of these components such as, for example, the MFD server 112, may be implemented as a separate subsystem and may reside external to the Transportation Subsystem.

Route Planner 118 provides an interface to access the transportation resource management (TRM) software 108. According to a specific embodiment, the TRM component may keep track of the current state of all delivery windows which may be organized according to a per-zone basis. Delivery vehicles may be assigned to zones as part of the delivery planning. The Route Planner 118, working in conjunction with TRM 108, allocates specific routes and stops to specific delivery vehicles. Preferably, a stop will be scheduled for a particular customer within that customer's selected delivery time window. When a customer selects a delivery window, the delivery window business object submits the request to the Transportation Subsystem's Route Planner 118. The Route Planner then performs a verification check to verify that the selected delivery window can be promised to the customer.

Although the MFD server 112 may conceptually be grouped with the Transportation Subsystem, in a specific embodiment, the MFD server component 112 may be configured to include at least one back-end server which resides in a particular area data center. Thus, different areas may be serviced by different MFD servers. Moreover, each zone in a particular area may serviced from a station which may be connected to the area data center via the data network. Each mobile field device (MFD) unit or client 106 may connect to an area MFD server 112 via the data network, and download and/or upload various types of information, including, for example, customer order history information, delivery information (e.g. vehicle delivery routes, stops, etc.), customer returns information, credits, adjustments, etc.

The Customer Relationship Management Subsystem 126 is an interactive application which may be used by customer service representatives (CSRs) 143 to manage customer service requests and to track customer interaction. The functionality provided by the CRM subsystem may include, for example, accessing customer information; issuing credits for various customer issues (e.g. complaints, returns, damaged goods, etc.); handling work flow for processing customer issues; etc. The CRM subsystem provides CSRs (sometimes referred to as customer service operators—CSOs) with the ability to access, view, and edit customer information in accordance with customer requests.

The Order Fulfillment Subsystem 160 manages all functionality of the distribution center (DC) 170. In the embodiment of FIG. 1, the OFS includes appropriate hardware and/or software for managing the DC facility 170, including, for example, a warehouse management system (e.g. software application), at least one database 161, at least one interface 162, and an automated material handling (AMH) controller component 163, which manages the conveyor, carousel, and scanner components. In a specific implementation, the Order Fulfillment Subsystem 160 may be implemented using a warehouse management system such as, for example, the MOVE warehouse management system provided by Optum, Inc. of Costa Mesa, Calif. The warehouse system also provides the interface with the Order Management Subsystem. In a specific embodiment, this interface is implemented using a business host interface (BHI). The warehouse management subsystem may also provide the interface for allowing the OMS subsystem to communicate with the OFS database 161.

The Order Management Subsystem (OMS) 150 manages a variety of aspects related to the integrated system architecture of the present invention, including, for example, pricing, availability, inventory, vendors, financials, procurement, and data flows between various subsystems. OMS includes an inventory component which is responsible for maintaining inventory records, determining inventory availability, and replenishment of inventory stock. OMS subsystem 150 includes graphical user interface 152, and at least one database 151 for storing various data received from at least a portion of the other subsystems.

The Order Management Subsystem may be configured to support both asynchronous and synchronous interfaces with the other subsystems. In a specific embodiment, the OMS is configured to support an asynchronous interface with each of the other subsystems. This configuration provides a number of advantages described in greater detail below. Additionally, each OMS interface is configurable, and may be configured to support the running of batch processes as often as is desirable.

According to a specific implementation, all PUB-OMS and WS-OMS interface programs are configured to operate at the database schema level. New and updated data may be posted to a persistent message queue (e.g. staging tables) within the data source database. From there, the data may be processed into the destination database.

Implementation of the various interfaces between OMS and the other subsystems may be accomplished using a variety of different techniques commonly known to one having ordinary skill in the art. The following description provides an example of at least one such technique which may be used for interfacing OMS with the other subsystems. However, it will be appreciated that the specific interfaces described below may be implemented using other techniques commonly known to those skilled in the art.

The interface between the OMS and the Webstore Subsystem may be implemented, for example, using a plurality of executable programs. A first portion of the executable programs may be responsible for moving data from the Webstore to the OMS. This data may include, for example, new/updated customer data, new/updated order data, order cutoff information, order billing information, customer return information, customer credits and fees (e.g. bill adjustment data), etc. A second portion of the executable programs is responsible for moving data from the OMS to the Webstore Subsystem. This data may include, for example, inventory data, availability data, pricing data, and information about shipped customer orders.

Figure 2:
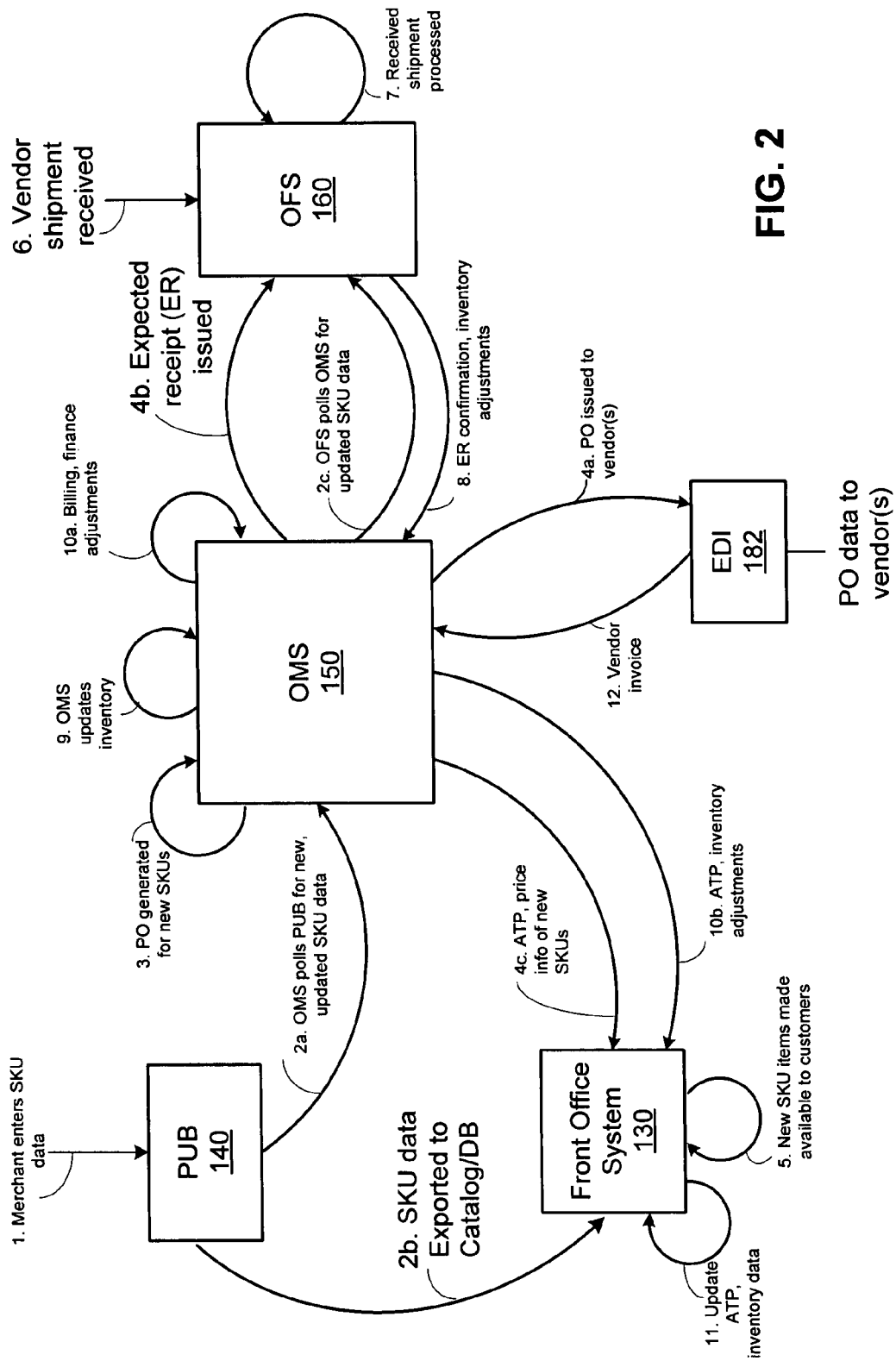
FIGS. 2 and 3 provide high-level state diagrams of various subsystem interactions during normal business operations.

FIG. 2 provides a high-level state diagram of the various subsystem interactions during normal business operations. More specifically, FIG. 2 provides a high-level walkthrough of subsystem interactions relating to inventory inflow (e.g. inventory replenishment). Referring to FIG. 2, at (1) new or modified item (SKU) information may be entered by a merchant into the PUB Subsystem 140 via either the PUB Web GUI (134, FIG. 1) or Bulk Loader interface (136, FIG. 1). The SKU information may include descriptive information about the item such as, for example, UPC codes, images, nutritional information, attributes, product name, etc.

At (2a) the OMS periodically polls the PUB for new or updated SKU data. The new/updated SKU data is stored within the OMS database 151 (FIG. 1). At (2b) the SKU data is also automatically exported to the database and catalog components of the Front Office system 130. According to the embodiment of FIG. 2, however, new items which are imported into the master Webstore catalog are not made available to customers until a purchase order has been issued for the new item. At (2c) the OFS periodically polls the OMS for new/updated SKU data. The new/updated SKU data is stored in the OFS database 161 (FIG. 1).

At (3) it is assumed that a buyer has approved a purchase order (PO) which has been generated for a new item at the Order Management Subsystem 150. Once the PO has been approved, at (4a) the PO is automatically sent to the appropriate vendor(s) via the EDI Subsystem 182. Additionally, at (4b) an expected receipt (ER) for the purchase order item(s) is automatically issued from OMS 150 to OFS 160. The expected receipt informs OFS that specific item quantities (related to the purchase order) are expected to arrive at the distribution center on or near a particular date.

Additionally, after the purchase order for the new item has been dispatched, at (4c) the OMS 150 automatically informs the Front Office system 130 of the availability date, the availability, and the price of the new item. In at least one embodiment, availability includes specific data about how many units of the new item will be available on specific dates. According to another specific embodiment, OMS 150 also informs Front Office 130 about any applicable expiration data for the item. This availability data is referred to as available-to-promise (ATP) data.

Once the Webstore receives the ATP and price data of a new item, at (5) the new item information is automatically made available for customer viewing and purchasing. The item information displayed to the customer may be obtained from the catalog data previously imported into the Webstore catalog from the PUB Subsystem.

At (6) it is assumed that a vendor shipment relating to the new purchase order item(s) is received at the distribution center. At (7) the received shipment is processed, which includes inventorying and storing each item of the received shipment. Once the received shipment has been processed, at (8) an expected receipt confirmation is issued from OFS 160 to OMS 150. Additionally, OFS provides any inventory adjustments (e.g. shorts) relating to the original purchase order and the received shipment. When the OMS receives the expected receipt confirmation data, at (9) the OMS processes the data and updates its inventory records and ATP information. Once the OMS inventory records have been updated, at (10a) the OMS performs any necessary billing and/or finance adjustment relating to the purchase order, based upon the expected receipt confirmation data. Additionally, at (10b) revised ATP and inventory data relating to the received item(s) are sent from the OMS 150 to the Front Office system 130. At (11), the Front Office system (e.g. Webstore) updates its ATP and inventory records for the appropriate item(s) based upon the revised data received from the OMS.

At (12), the vendor issues an invoice for the purchase order shipment via the EDI subsystem 182. It will be appreciated, however, that this latter event may occur at any time after the purchase order has been received by the vendor.

Additionally, the product availability (ATP) displayed to the customer will automatically be updated based upon the order status and expected arrival date of the product, as well as the availability of the product once it has arrived at the distribution center. In this way, the technique of the present invention significantly reduces the amount of manual labor needed for managing and maintaining all aspects of inventory inflow.

Figure 3:
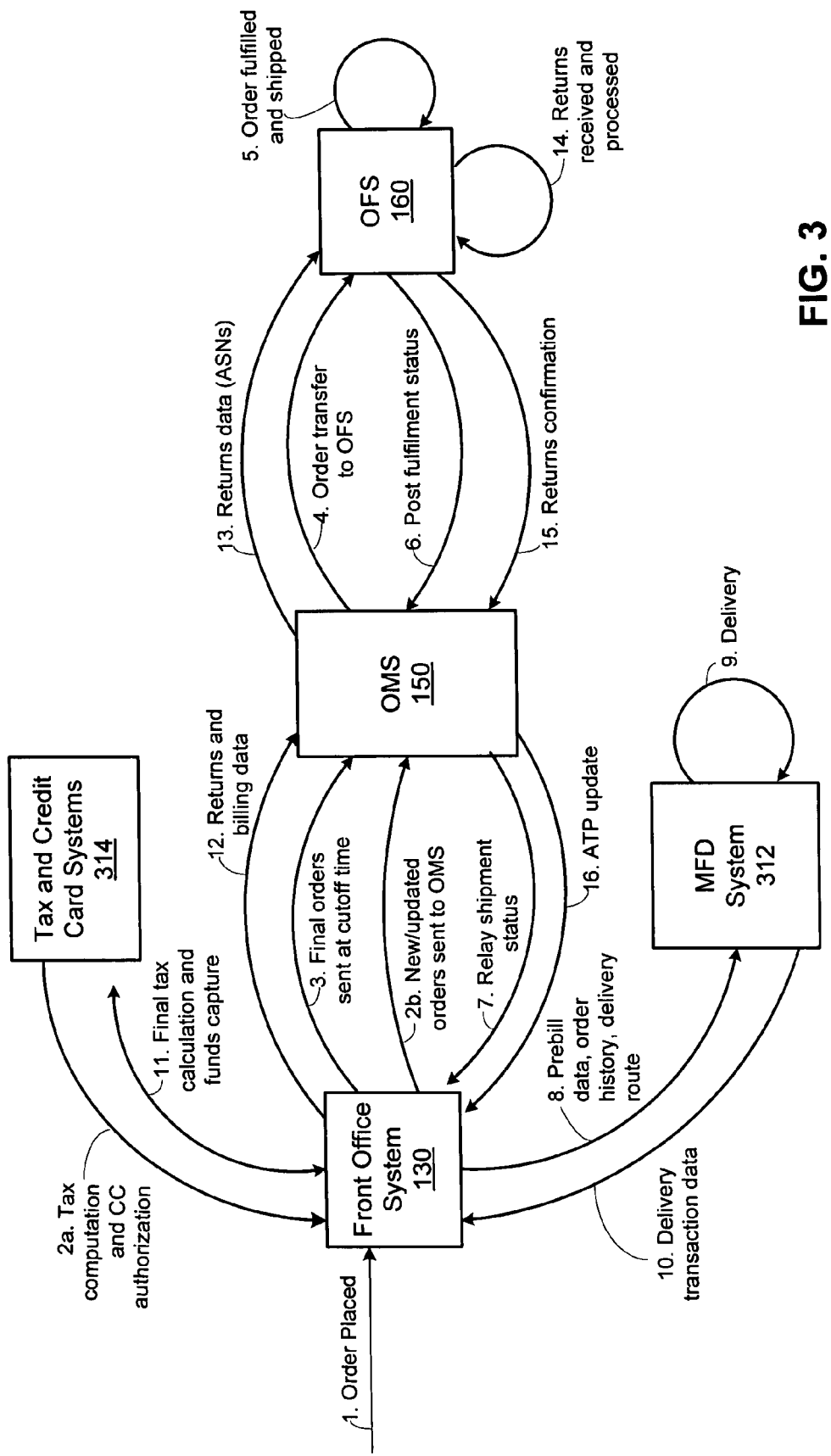

Referring now to FIG. 3, a high-level walk-through of subsystem interactions relating to inventory outflow (e.g. customer ordering, fulfillment, and delivery) is shown. At (1) an order is placed by a customer via the Webstore of the Front Office system 130. According to a specific embodiment, the customer order is placed after the customer performs a "checkout" procedure whereby items from the customer's electronic shopping cart are processed for purchasing. After the customer completes the checkout procedure, at (2a) the Webstore performs tax computation and credit card authorization for the total value of the order. According to at least one embodiment, the customer is not billed for the order at this time. Rather, using the customer's credit card or debit card information, an authorization is obtained which verifies the available credit limit and validity of the customer's credit or debit account. According to a specific embodiment, tax computation and credit card authorization may be performed by the tax and credit card systems 314 which, in the embodiment of FIG. 1, are components of the Webstore Subsystem 132. Further, according to a specific embodiment, each scheduled order will have an associated credit (or debit) card authorization.

After the customer order has been placed, but before a predetermined cutoff time has elapsed, the customer may cancel or modify any part of the order, including modifying the delivery time window associated with the order. Customer service representatives (CSRs) are also permitted to make changes to scheduled orders until cutoff time. Additionally, during this time, at (2b) the OMS periodically polls the Webstore for new or updated scheduled orders so that the OMS may process any necessary demand planning. According to a specific implementation, the cutoff time for a particular customer order is determined based on the delivery window of the scheduled order.

In a specific embodiment, order modifications may be implemented by making a new Webstore order, which is an action that may create new scheduled orders or change existing scheduled orders. A customer or CSR may make changes such as, for example, deletion of ordered items, modifying the quantity of one or more ordered items, modifying delivery times or delivery destinations, or canceling entire shipments. If changes require any credit card re-authorization, the Front Office software will handle it.

At cutoff time, the Transportation Subsystem of the Front Office adds finalized route information to the customer order. After the cutoff time, at (3) the OMS polls the Webstore to obtain the final information relating to the scheduled order(s). As will be discussed in greater detail below, prior to cutoff, the Webstore has been updating its ATP data each time an item is placed in a scheduled cart by a customer, or each time an unscheduled cart with items in it is scheduled. The OMS then updates its ATP data so that it is in synchronization with the Webstore ATP data. According to a specific embodiment, the only time that the OMS and Webstore ATP data are out of synchronization is when new deliveries are received at the distribution center, and the new ATP data has not yet been propagated to the Webstore. The OMS calculates its ATP data based upon shipments received at the distribution center and certain other transactions.

After the pre-determined cutoff time for a particular customer order has elapsed, the customer is temporarily prevented from modifying or canceling the order. According to a specific embodiment, before the cutoff time has occurred, the OMS will place the customer order on hold to prevent it from being passed to the OMS for fulfillment. After cutoff, when the order is "final" or "frozen," the OMS will remove the hold on the order so that the order will be passed to the OFS 160 for fulfillment, as shown at (4). An order may be considered final or frozen when all of its information (e.g. order information and delivery information) is final. The order data which is transferred to the OFS subsystem 160 may include both SKU data and transportation/delivery data (e.g. delivery vehicle routes, stops, etc.).

At (5) orders received at the OFS subsystem are fulfilled and processed for shipment to the customers. The ordered items are transported in containers or totes. Each tote has a unique physical license plate ID which includes bar codes that may be read by a scanner. Each tote is associated with a respective customer order. Each customer order may comprise one or more totes.

After the order has been fulfilled and processed for shipment, at (6) the OFS transmits post fulfillment status data relating to the customer order to the OMS. The post fulfillment status data may include, for example, the number of totes and the physical license plate ID of each tote associated with the customer order, the ID of each shipping dolly used to transport the totes to and from the delivery trucks, and/or the vehicle ID associated with the shipped order. At (7) the OMS relays the shipment status information to the Webstore of the Front Office system 130. The shipment status data may include inventory adjustments for ordered items which were not fulfilled. The Webstore then updates the order status of the shipped order, which may be accessed by the customer and CSRs.

Once the shipment status information is received at the Front Office system 130, the Front Office system downloads pre-bill data, customer order history data, and delivery route data to the mobile field device (MFD) system 312. According to a specific embodiment, the Transportation Subsystem of the Front Office transmits the pre-bill, customer order history, and delivery route data to an MFD server, which then downloads the data into a mobile field device (i.e. MFD or MFD client).

After the proper data has been downloaded into the MFD, the delivery courier may be dispatched to deliver the order to the customer. At (9) the order is delivered to the customer by the delivery courier. At this time, the delivery courier may use the mobile field device to process tote returns, item returns, order modifications, order adjustments, credits, tax calculations, etc. According to a specific embodiment, the mobile field device (MFD) is configured to process the above-described customer service transactions without communication to the MFD server. After the various customer service requests have been processed by the MFD, the courier may present the customer with a modified billing receipt which includes an adjusted total amount that takes into account any processed returns, order modifications, adjustments, credits, and/or new tax calculations.

Additionally, at the time delivery is made to the customer, the delivery courier may scan each delivered item using the MFD in order to generate a record of items actually received by the customer. This information is stored in the MFD along with a delivery time stamp.

When the delivery courier returns to the area station, the processed data stored in the MFD is uploaded to the MFD server. According to a specific embodiment, the MFD data may also be remotely uploaded into the MFD server via a wireless communication system, while the delivery courier is in the field. At (10) the delivery transaction data is transferred from the MFD system 312 to the Front Office system 130. According to a specific embodiment, the MFD server transfers the delivery transaction data to the Transportation Subsystem, which then updates the order status information in the Front Office database. At (11) the Front Office system performs final tax calculations based upon the updated order status information, and initiates a funds capture using the customer's billing information. It is at this point that the customer is actually billed for the order. Moreover, the billed amount will take into account any returns, order modification, adjustments, and/or credits which were processed by the MFD at the time of delivery.

At (12) the Webstore transmits the final invoice data and returns data to the OMS. The OMS processes the final invoice data and returns data, and updates the customer invoice and billing records accordingly. Additionally, at (13) the OMS notifies the OFS of any returns (by way of advance shipment notices) so that the OFS may properly process the returned items once received. At (14) the returned items are received and processed by the OFS. After the returned items have been processed and restocked in the distribution center, at (15) the OFS transmits returns confirmation data to the OMS. The OMS then updates its inventory and ATP data based upon the returns confirmation data received from OFS. Additionally, at (16) the OMS forwards the updated ATP data to the Front Office system 130, whereupon the Webstore updates its ATP information.

One advantage of the integrated system architecture of the present invention relates to available-to-promise (ATP) information about catalog items presented to the customer. According to at least one embodiment of the present invention, the ATP information associated with a particular item may be used to regulate the order inflow for that item.

According to a specific embodiment, the Webstore Subsystem keeps track of the number of available items, and only allows customers to select items that are guaranteed to be available in a given time slot. The display may be based upon expected (e.g., scheduled) arrival of SKUs into the distribution center. If a shipment does not arrive or is delayed, this information is propagated to the WS, whereupon the WS automatically updates the availability information relating to the items of the delayed shipment. The WS may keep track of the time slots in which an item is available, using "available", "available until", and "available on" labels in the store display.

According to an alternate embodiment, ATP values (e.g., quantities of specific items which are available to promise) are computed in OMS and published to the Webstore. The ATP data may be computed, for example, based on a SKU inventory management method, an ATP method, physical inventory quantity, and/or quantities scheduled to be received from vendors. According to one embodiment of the present invention, the Webstore Subsystem is responsible for computing current ATP data. However, according to a different embodiment, the OMS may perform this function.

Figure 4:
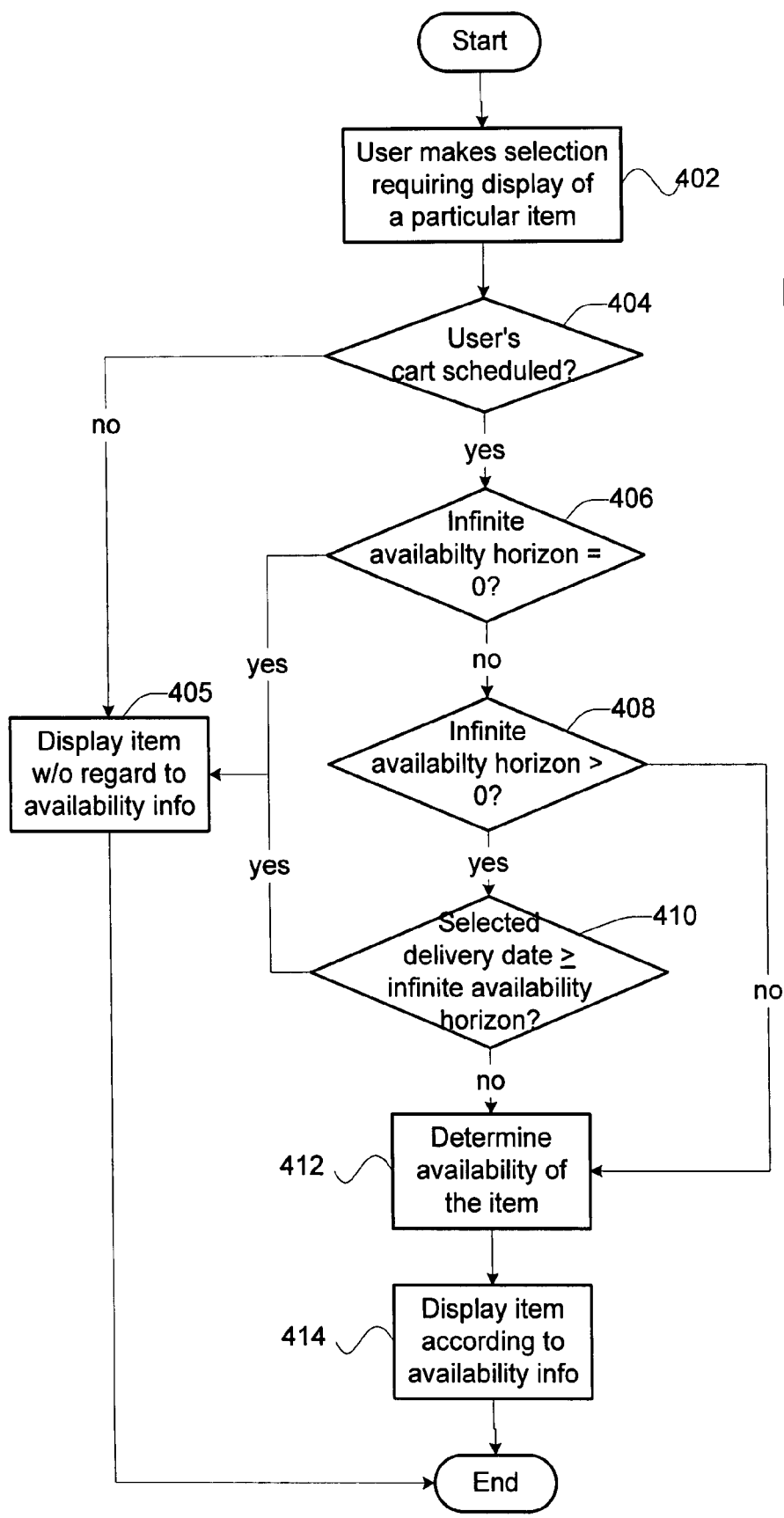
FIG. 4 is a flowchart illustrating determination of availability information according to a specific embodiment of the present invention.

A specific method of determining availability information, i.e., ATP data, for a specific SKU will now be described with reference to the flowchart of FIG. 4. When a consumer performs an action in the Webstore interface which requires the presentation of a product representation (402), i.e., the consumer uses search engine 120 or navigates catalog 122 to find the product, the product representation is shown with or without regard to availability information depending upon whether the consumer's "cart" has been scheduled. That is, if the consumer has not selected a delivery slot (404), the product representation is shown without regard to availability information for that SKU (405). That is, where the item is assumed to be currently available, its availability is not calculated and its graphical representation may be displayed with an indication that the item is available, or, because its availability may be inferred from its presentation, without any additional message.

By contrast, if the consumer has selected a delivery slot (404), the type of the product is determined with reference to a metric associated with each SKU known as the "infinite availability horizon." That is, there are three types of SKUs from the perspective of the infinite availability horizon metric: limited availability SKUs (finite quantity in stock which, once exhausted, can't be promised until more come in), dependably available SKUs (always in stock, can sell as many as are ordered), and SKUs which have limited availability for some number of days beyond which they are assumed to be dependably available. The infinite availability horizon defines the time, if any, at which the associated SKU becomes dependably available. For the first type of SKU this metric is set to −1 indicating that the product never becomes dependably available. For the second type, the metric is set to 0 indicating that the product is always available (e.g., right now). For the third type, the horizon is set to n indicating that the product is assumed to be dependably available n days from now (according to a specific embodiment, the value is actually in seconds).

If the item selected by the consumer is of the second type (406), e.g., the infinite availability horizon=0, the item is displayed without regard to the availability information (405) because the item is always available. If the item is determined not to be of the second type (406) but is determined to be of the first type (408), e.g., the infinite availability horizon=−1, the availability of the item is determined (412) (as will be discussed in greater detail below) and the item is displayed in accordance with the availability information (414).

That is, according to specific embodiments, the item may be displayed with information which indicates the item's availability to users. For example, if the item is currently unavailable, its graphical representation might be accompanied by the message "Coming soon" or "Currently unavailable." Where a specific date is known on which a particular item will become available, the accompanying message might indicate that date. As described above with reference to 405, where the item is determined to be currently available, its graphical representation may be displayed with an indication that the item is available, or, because its availability will be assumed, without any additional message.

If the selected item is of the third type (408), e.g., the infinite availability horizon >0, and the selected delivery date is beyond the infinite availability horizon (410), the item is displayed as available without regard to the availability information (405). If, on the other hand, the selected delivery date is earlier than the infinite availability horizon (410), the availability of the item is determined (412) (as will be discussed in greater detail below) and the item is displayed in accordance with the availability information (414) as discussed above.

As mentioned above, the availability of a selected item is determined with reference to ATP data. These data are generated in part from a number of tables in the OMS which represent physically available inventory (i.e., inventory in the warehouse), inventory which is expected to come (e.g., as reflected in purchase orders), information about orders fulfilled on a given day (e.g., from the OFS). That is, these tables in the OMS provide an inventory "snapshot." Each table gets affected by a variety of inventory transactions. For example, if something gets "put away" in the distribution center, i.e., placed in a carousel, OFS sends this information to OMS to populate physically available inventory table.

An OMS posting process periodically collects these data and determines and posts ATP data to the WS. According to a specific embodiment, the process is run once an hour. According to other embodiments, the process can be run at any interval or even asynchronously. The OMS posting process uses time stamps so that for each posting only information changed since the last posting is collected and posted. That is, the entries in the WS tables (described below) for a particular SKU are only altered at a posting where there has been an event for that SKU in the last hour. Such events may include, for example, putaways, issuing of purchase orders, transfers, etc.

The ATP table in the WS (an example of which is shown in FIG. 5) stores the available (i.e., selling) quantity and the reserved quantity for each SKU. The available quantity comes from the OMS tables, i.e., is "pushed" from the OMS to the WS periodically. The reserved quantity is updated by the WS as customers place orders. The difference between these two numbers presents an up-to-date picture of how much of a particular SKU may be sold on any given day. That is, customer orders for a particular product on a given day may be placed against the quantity available on that day. In determining the available quantity from the OMS tables, some assumptions are made such as, for example, if SKUs related to a certain purchase order are expected on a given date, they are assumed to be available to promise some number of days, e.g., 2 days, after that date.

The reserved quantity in the ATP table is updated by the WS only for products selected by users who have also selected a delivery slot. That is, if a user has selected a delivery slot for their cart, any items in the cart or subsequently added to the cart will affect the reserved quantity data in the ATP table. If the user does not check out within some specified time out period, e.g., an hour, a garbage collection process "unloads" the abandoned cart. That is, the items in the cart are unreserved and the appropriate adjustments are then made to the reserved quantities in the ATP table.

According to a specific embodiment, the availability of specific items shown to the user in the WS catalog is approximate. That is, according to such embodiments, there may be multiple instances of the WS (e.g., 20) in a server farm each of which has an ATP table which needs to be synchronized. However, when availability information is displayed, the WS does not refer directly to the ATP table. Rather, the availability information for display is stored in a WS cache which is periodically updated, e.g., every 10 seconds. By contrast, when items are reserved, the WS makes a direct adjustment to the reserved quantity number in the ATP table. This creates the possibility of a race condition in which a specific product may be displayed as available to one user even though the last unit of the product was just reserved by another user in which case, an attempt to reserve by the first user would fail.

According to another embodiment, each instance of the WS is allocated a "quota" of each item that it can "sell." With this embodiment, synchronization between the multiple WS instances is required only when a particular WS exhausts its quota.

The SKU table and the ATP table in the WS database are the two main tables involved in the ATP calculation. In the SKU table, the columns of interest are the SKU ID, the infinite availability horizon (i.e., the point beyond which the product is assumed to be dependably available), and the ATP method (i.e., whether computed or manual). For computed availability SKUs, the availability of unsold units is automatically rolled over to subsequent days.

By contrast, manual availability SKUs are only available on a given day. If the items are unsold on that day, the item is scrapped. That is, the availability of unsold units is not rolled over the subsequent days. An example of a manual availability SKU is a prepared meal. Because there is a limited amount of prepared meal production capacity available each day, the number of available units of such a SKU is set to the number of the item which may be produced on a given day. And because prepared meals must be sold on the day they are prepared, unsold meals are disposed of and the availability number is reset each day.

In the ATP table (an example of which is shown in FIG. 5), the columns of interest are the SKU ID, the availability time (i.e., identifies a particular day), the available quantity (posted by the OMS), and the reserved quantity (posted by the WS). The availability time has two functions in relation to the available quantity. First, it tells how much of the particular SKU is in stock right now (the code indicates 1/1/1900 for currently available items). Second, it tells how much is coming in the future (the code indicates the date upon which the incoming items are expected). According to another embodiment, the ATP table includes an additional column called "expired quantity" which uses expiration dates for selected SKUs to determine a number of units which will no longer be available because they have expired.

According to a specific embodiment, the ATP calculation (e.g., 412 of FIG. 4) is a recursive algorithm which, each time it is run, takes into account any new information in either of the available or reserved quantity columns of the ATP table. Referring to the ATP table of FIG. 5, 100 units of SKU 0001 are shown to be currently in stock (i.e., availability time=1/1/1900). Fifty-five of the available 100 units are reserved by customers for the $14^{th}$ and $15^{th}$ of February. On the $16^{th}$, 50 units are expected so the number of units available to promise for the $16^{th}$ is 100−55+50=95, 35 of which are actually reserved on the $16^{th}$-$18^{th}$. On the $19^{th}$, 20 more units are expected so the number of units available to promise for the $19^{th}$ is 95−35+20=80, 15 of which are actually reserved on the $19^{th}$. Generally speaking, negative quantities (i.e., reserved quantities) propagate up the table, while positive quantities (i.e., available quantities) propagate down. Of course, in embodiments which include expired quantity data in the ATP table, this information is included in the computation.

Each time a customer places an item in a scheduled cart, the reserved quantity for that SKU and availability time corresponding to the delivery date is incremented. Subsequent ATP calculations are then run based on the incremented reserved quantity. In cases where the customer is scheduling delivery of a particular item beyond the indicated infinite availability horizon for that item, the ATP calculation need not be performed in that the item is assumed to be dependably available at that time.

When all of the available units for a particular SKU have been reserved, several things can happen depending upon the value of the infinite availability horizon and/or future available quantity data for that SKU. For SKUs having an infinite availability horizon of −1 (i.e., the item never becomes dependably available), the catalog entry is either changed to indicate that the item is currently unavailable, or that it will be available on a specific date determined from future available quantity data. For SKUs having a positive value for infinite availability horizon (i.e., the item becomes dependably available at some point in the future), the catalog entry is changed to indicate either that the item will be available on the date which corresponds to the value of the infinite availability horizon or on a specific date indicated by the future available quantity data, whichever is earlier. That is, customers will be able to reserve the item if they schedule delivery on or after the indicated date.

Thus, "available on" labels are determined either from the infinite availability horizon value or from future available quantity data, whichever yields the earliest date. By contrast, "available until" labels are determined from a disable date which is associated with particular SKUs which are to be available only up until the disable date, e.g., holiday specials.

A specific embodiment of the present invention will now be described with reference to flowchart 600 of FIG. 6. Generally speaking, an order is automatically split into two orders if selected items are available at different times. For example, if a user's cart is scheduled for 2-15 and the user selects an item which is not available until 2-16, the WS automatically splits the order into two carts, the original cart being scheduled for 2-15 and a second unscheduled cart. A message is then presented to the user giving the user the option of specifying a subsequent delivery slot for unscheduled cart or for the entire order. The available delivery slots are constrained by the latest available item selected.

In addition, if an unscheduled cart loaded with a number of items is subsequently scheduled for a delivery slot which is prior to the availability of some of the items, the order is split into two carts, one for the scheduled delivery slot containing all of the items available on or before that date, and one unscheduled cart for the remaining items, the scheduling of which is constrained as described above.

Figure 6:
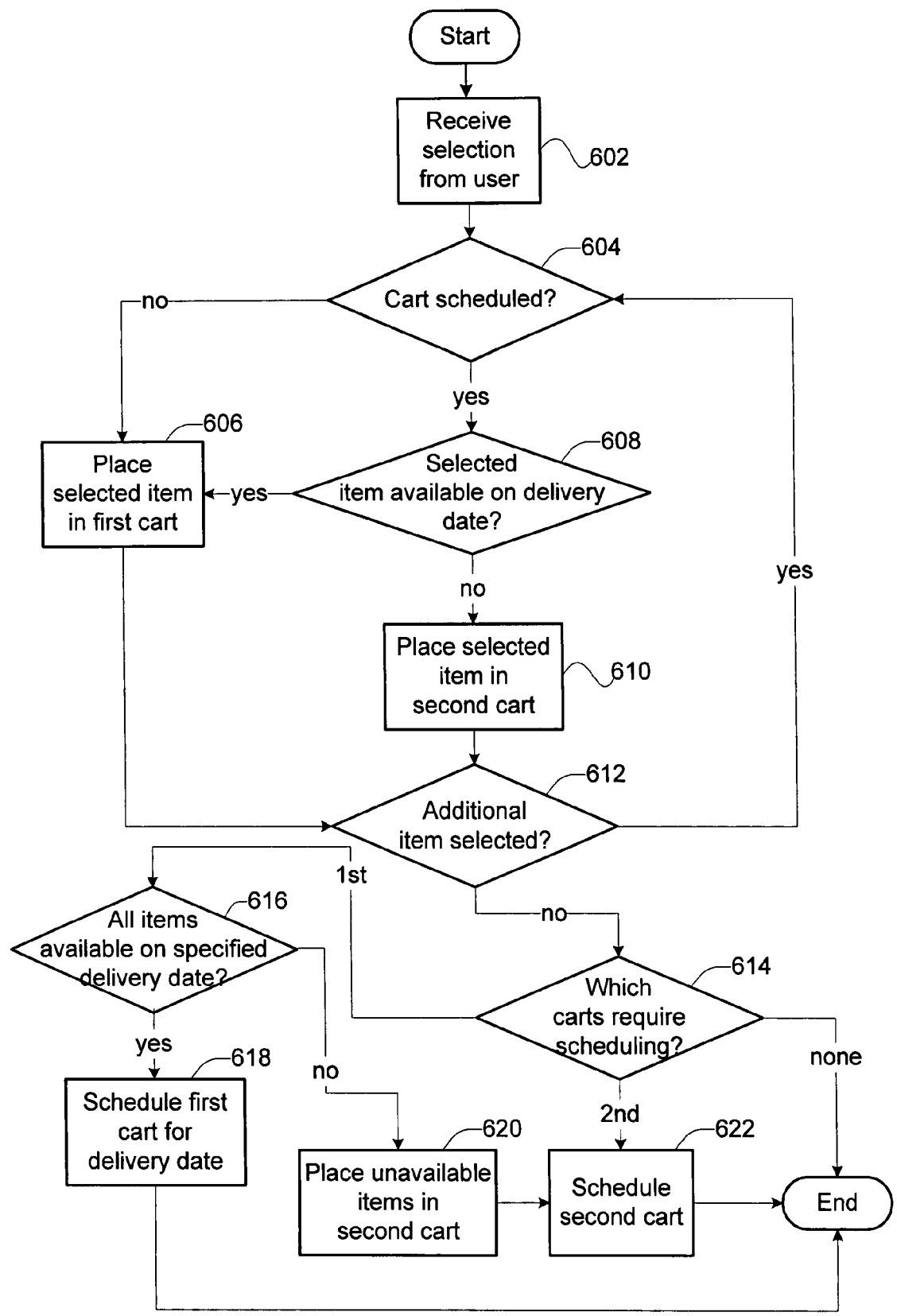
FIG. 6 is a flowchart illustrating a process by which a customer's order is split according to a specific embodiment of the invention.

Referring now to FIG. 6, when a user selects an item in the WS interface (602) and the user's cart has not been scheduled (604), the selected item and each additional selection are placed in the user's unscheduled cart (606 and 612). If the user has specified a delivery date (604) and the selected item is available on the delivery date (608), the selected item and each additional selection satisfying this criterion are placed in the user's scheduled cart (606 and 612). If, on the other hand, the selected item is not available on the specified delivery date (608), the selected item is placed in a second unscheduled cart (610). Each additional item which is unavailable on the delivery date (612 and 608) is likewise placed in the second cart.

When no additional items are to be added to the user's order (612) and there are no carts to be scheduled, i.e., there is only one cart and a delivery date has already been specified, (614), the process ends. If there are two carts, i.e., the first cart has been scheduled and the second cart needs to be scheduled (614), the second cart is scheduled such that all items in the second cart will be available on the scheduled date (622). At this point, the user may elect to schedule delivery of all of the items in both carts at this later date.

If no delivery date has yet been specified, i.e., there is only one unscheduled cart (614), and there are no items in the cart which are unavailable on a delivery date subsequently specified by the user (616), the cart is scheduled for delivery on the delivery date specified by the user (618) and the process ends. If, on the other hand, at least one item in the user's cart is unavailable on the user's specified delivery date (616), the unavailable item(s) is(are) placed in a second cart (620) which is then scheduled such that all items in the second cart are available on the scheduled date (622). As described above, at this point, the user may elect to schedule delivery of all of the items in both carts at this later date.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A computer implemented method for providing availability information for a plurality of products for publication to a plurality of customers to allow the plurality of customers to place orders to an online store via a wide area network, comprising:

calculating a first availability information regarding a product for a first customer with reference to first delivery information, a first available number of units for the product, and a first reserved number of units for the product,
  wherein the calculating is performed for a first customer using a first server of a plurality of servers of the online store via the wide area network,
  wherein the first availability information comprises a first quantity,
  wherein the first delivery information has been specified by the first customer via the wide area network,
  wherein the first available number of units for the product has been determined with reference to inventory information,
  wherein the first reserved number of units for the product has been determined with reference to current order information;
providing the first availability information to the first customer through a first server of the plurality of servers of the online store via the wide area network;
allowing the first customer to place an order on the product via the wide area network;
determining a value of the order;
calculating a second availability information regarding the product for a second customer with reference to second delivery information, a second available number of units of the product, and a second reserved number of units for the product,
  wherein the calculating is performed for the second customer using a second server of the plurality of servers of the online store via the wide area network,
  wherein the second availability information comprises a second quantity, which can be different from the first quantity,
  wherein the second availability information is capable of being provided to the second customer at the same time as the first availability information is being provided to the first customer, and
  wherein the second availability information is calculated without taking into account the first availability information of the product, which has been provided to the first customer, and without taking into account whether the first customer has placed the order on the product; and
subsequent to the first availability information having been provided to the first customer and the second availability information having been provided to the second customer, synchronizing the first server and the second server with reference to availability information of the product.

2. A computer implemented method as recited in claim 1, wherein the first availability information is determined on a certain day, and
wherein the first available number of units is determined with reference to at least one of first items which are physically in inventory, second items which have been ordered but have not yet been shipped, third items that have been shipped on the day of determining the first availability information, and fourth items that have been scheduled to arrive.

3. A computer-implemented method as recited in claim 1, wherein the first availability information of the product depends on a number of units of the product being affected by an expiration date.

4. A computer-implemented method for providing availability information for a plurality of products to a plurality of customers to allow the plurality of customers to place orders to an online store via a network, comprising:
  determining a first availability information for a product based on a reserved number of units of the product, and a number of units of the product physically in inventory;
  providing the first availability information of the product to a first customer through a first server;
  allowing the first customer from the plurality of customers to place an order for the product through the first server of a plurality of servers of the online store via the network,
    wherein the reserved number of units depends on at least one order having at least one unit placed into an electronic shopping cart through the first server of the online store by another customer for the product and the at least one order has not yet been shipped to the another customer;
  determining and providing a second availability information regarding the product to a second customer of the plurality of customers through a second server of the plurality of servers of the online store via the wide area network,
    wherein the second availability information is capable of being provided to the second customer at the same time as the first availability information is being provided to the first customer,
    wherein the second availability information is determined without taking into account the first availability information of the product, which has been provided to the first customer, and without taking into account whether the first customer has placed the order on the product, and
    wherein the first availability information comprises a first quantity, and the second availability information comprises a second quantity, which can be different from the first quantity; and
  subsequent to the first availability information having been provided to the first customer and the second availability information having been provided to the second customer, synchronizing the first server and the second server with reference to availability information of the product.

5. A computer-implemented method as recited in claim 4 wherein the first availability information indicates a point in time after which the product will not be available.

6. A computer-implemented method as recited in claim 4 wherein the first availability information indicates a point in time after which the product will be available.

7. A computer-implemented method as recited in claim 4 wherein the first availability information indicates the product to be available without indication of said product having a limited quantity in stock.

8. A computer-implemented method as recited in claim 4 wherein the first availability information indicates the product having limited availability or with only a limited quantity in stock.

9. A computer-implemented method as recited in claim 4 wherein the first availability information indicates that the product will be available by a certain date.

10. A computer-implemented method as recited in claim 4 wherein the first availability information indicates that the product will be available up until a certain date.

11. A computer-implemented method as recited in claim 4, wherein the first availability information is determined with respect to a production capacity for the product.

12. A computer-implemented method as recited in claim 11, wherein the first availability information is reset each day.

13. A computer-implemented method as recited in claim 4, wherein the first availability information of the product also depends on delivery information determined by the first customer in the order the first customer placed via the network.

14. A computer-implemented method as recited in claim 13 further comprising determining the first availability information with reference to the delivery information.

15. A computer-implemented method as recited in claim 14, wherein the first availability information is determined also with reference to a number of units of the product scheduled to arrive in inventory, and a number of units of the product affected by an expiration date.

16. A computer-implemented method as recited in claim 4, wherein each of the first and the second availability information is related to at least a quota for the product, and wherein the time to synchronize the first and the second servers depends on one of the quotas being exhausted.

17. A computer-implemented method as recited in claim 4, wherein synchronization of the first and the second servers occurs periodically.

18. A computer-implemented method as recited in claim 4 further comprising:
receiving a first delivery date regarding the order from the first customer via the network;
determining another availability information for another product in the order;
scheduling delivery of the product based on the first delivery date, the first availability information for the product indicating the product availability with respect to the first delivery date; and
enabling the customer to schedule delivery of the another product based on a second delivery date, which is subsequent to the first delivery date, the another availability information for the another product indicating the another product availability with respect to the second delivery date.

19. A computer-implemented method as recited in claim 18 further comprising enabling the first customer to schedule delivery of the product and the another product based on the second delivery date.

20. A computer readable medium containing executable computer instructions stored thereon for providing availability information for a plurality of products to a plurality of customers to allow the plurality of customers to place orders to an online store via a network, by a method comprising:
determining a first availability Information for a product based on a reserved number of units of the product, and a number of units of the product physically in inventory;
providing the first availability information of the product to a first customer through a first server;
allowing the first customer of the plurality of customers to place an order using an electronic shopping cart of the online store through the first server of a plurality of servers of the online store, for the product via the network,
wherein the reserved number of units depends on at least one order having at least one unit placed into an electronic shopping cart through the first server of the online store by another customer for the product and the at least one order has not yet been shipped to the another customer;
determining and providing a second availability information regarding the product to a second customer of the plurality of customers through a second server of the plurality of servers of the online store via the wide area network,
wherein the second availability information is capable of being provided to the second customer at the same time as the first availability information is being provided to the first customer,
wherein the second availability information is determined without taking into account the first availability information of the product, which has been provided to the first customer and without taking into account whether the first customer has placed the order on the product, and
wherein the first availability information comprises a first quantity, and the second availability information comprises a second quantity, which is can be different from the first quantity; and
subsequent to the first availability information having been provided to the first customer and the second availability information having been provided to the second customer, synchronizing the first server and the second server with reference to availability information of the product.

21. A computer readable medium as recited in claim 20 wherein the first availability information indicates a point in time after which the product will not be available.

22. A computer readable medium as recited in claim 20 wherein the first availability information indicates a point in time after which the product will be available.

23. A computer implemented method for providing availability information of one or more products to a plurality of customers to allow the plurality of customers to place orders to an online store via a network, comprising:
determining a first availability information of a product based on a reserved number of units of the product and a number of units of the product physically in inventory;
providing the first availability information of the product to a first customer from a first server via the network, wherein the reserved number of units depends on at least one order having at least one unit for the product placed into an electronic shopping cart of the online store by another customer and the at least one order has not yet been shipped to the another customer;
allowing the first customer to place an order for the product using an electronic shopping cart of the online store through the first server;
determining a second availability information of the product, and providing the second availability information of the product to a second customer from a second server via the network,
wherein the second availability information is capable of being provided to the second customer at the same time as the first availability information is being provided to the first customer,
wherein the second availability information is determined without taking into account the first availability information of the product, which has been provided to the first customer, and without taking into account whether the first customer has placed the order on the product, and
wherein the first availability information comprises a first quantity, and the second availability information comprises a second quantity, which can be different from the first quantity; and
subsequent to the first availability information having been provided to the first customer and the second availability information having been provided to the second customer, changing availability information of the product from at least one of the first and the second server for the consistency of the availability information of the product from the first and the second server.

24. A computer implemented method as recited in claim 23, wherein the first availability information indicates a point in time after which the product will not be available.

25. A computer implemented method as recited in claim 23, wherein the first availability information indicates a point in time after which the product will be available.

26. A computer-implemented method as recited in claim 23, wherein the first availability information indicates the product having limited availability or with only a limited quantity in stock.

27. A computer-implemented method as recited in claim 23, wherein the first availability information is determined based on at least a production capacity for the product.

28. A computer-implemented method as recited in claim 23, wherein the first availability information of the product also depends on delivery information specified in the order placed by the first customer.

29. A computer-implemented method as recited in claim 28, wherein the first availability information is determined also with reference to a number of units of the product scheduled to arrive in inventory, and a number of units of the product affected by an expiration date.

30. A computer-implemented method as recited in claim 23, wherein each of the first and the second availability information is related to at least a quota for the product, and
wherein changing availability information occurs when one of the quotas has been exhausted.

31. A computer-implemented method as recited in claim 23, wherein changing availability information occurs periodically.

32. A computer-implemented method as recited in claim 23 further comprising:
determining another availability information for another product in the order;
scheduling delivery of the product based on a first delivery date specified in the order; and
enabling the first customer to schedule delivery of the another product based on a second delivery date, which is subsequent to the first delivery date.

33. A computer-implemented method as recited in claim 32 further comprising enabling the first customer to schedule delivery of the product and the another product, both based on the second delivery date.

34. A computer readable medium containing executable computer instructions stored thereon for providing availability information of one or more products to a plurality of customers to allow the plurality of customers to place orders to an online store via a network, by a method comprising:
determining a first availability information of a product based on a reserved number of units of the product and a number of units of the product physically in inventory;
providing the first availability information of the product to a first customer from a first server via the network, wherein the reserved number of units depends on at least one order having at least one unit for the product placed into an electronic shopping cart of the online store by another customer and the at least one order has not yet been shipped to the another customer;
allowing the first customer to place an order for the product using an electronic shopping cart of the online store through the first server;
determining a second availability information of the product, and providing the second availability information of the product to a second customer from a second server via the network,
wherein the second availability information is capable of being provided to the second customer at the same time as the first availability information is being provided to the first customer,
wherein the second availability information is determined without taking into account the first availability information of the product, which has been provided to the first customer, and without taking into account whether the first customer has placed the order on the product, and
wherein the first availability information comprises a first quantity, and the second availability information comprises a second quantity, which can be different from the first quantity; and
subsequent to the first availability information having been provided to the first customer and the second availability information having been provided to the second customer, changing availability information of the product from at least one of the first and the second server for the consistency of the availability information of the product from the first and the second server.

* * * * *

UNITED STATES PATENT AND TRADEMARK OFFICE
CERTIFICATE OF CORRECTION

| | | |
|---|---|---|
| PATENT NO. | : 7,904,975 B2 | Page 1 of 1 |
| APPLICATION NO. | : 11/879484 | |
| DATED | : March 15, 2011 | |
| INVENTOR(S) | : Andre Kruglikov et al. | |

It is certified that error appears in the above-identified patent and that said Letters Patent is hereby corrected as shown below:

On the title page 3, item (56) under U.S. Patent Documents
In the left column, "2009/0083439 A1 3/2009 Rauser et al." should be --2009/0063439 A1 3/2009 Rauser et al.--.

In the Claims
Column 19, line 47 (Claim 20, line 6), "determining a first availability Information for a product" should be --determining a first availability information for a product--.

Signed and Sealed this
Fourth Day of March, 2014

Michelle K. Lee
*Deputy Director of the United States Patent and Trademark Office*